(12) United States Patent
Nishikawa et al.

(10) Patent No.: US 8,886,204 B2
(45) Date of Patent: Nov. 11, 2014

(54) TELECOMMUNICATION CONTROL METHOD, TELECOMMUNICATION SYSTEM, AND BASE STATION APPARATUS INVOLVING AN INTERCELL INTERFERENCE CONTROL TECHNIQUE

(75) Inventors: Daisuke Nishikawa, Tokyo (JP); Tetsushi Abe, Tokyo (JP); Motohiro Tanno, Tokyo (JP); Zhongding Lei, Singapore (SG); Sai Ho Wong, Singapore (SG); Francois Po Shin Chin, Singapore (SG)

(73) Assignees: NTT DoCoMo, Inc., Tokyo (JP); Agency for Science, Technology and Research, Singapore (SG)

( * ) Notice: Subject to any disclaimer, the term of this patent is extended or adjusted under 35 U.S.C. 154(b) by 67 days.

(21) Appl. No.: 13/704,256

(22) PCT Filed: Jun. 20, 2011

(86) PCT No.: PCT/JP2011/064598
§ 371 (c)(1),
(2), (4) Date: Dec. 14, 2012

(87) PCT Pub. No.: WO2011/162395
PCT Pub. Date: Dec. 29, 2011

(65) Prior Publication Data
US 2013/0090127 A1    Apr. 11, 2013

(30) Foreign Application Priority Data
Jun. 21, 2010  (JP) ................................ 2010-141083

(51) Int. Cl.
*H04W 40/00* (2009.01)
*H04W 72/08* (2009.01)
*H04W 72/12* (2009.01)
*H04W 72/04* (2009.01)
*H04W 84/04* (2009.01)

(52) U.S. Cl.
CPC ........ *H04W 72/082* (2013.01); *H04W 72/0426* (2013.01); *H04W 72/1215* (2013.01); *H04W 84/045* (2013.01)
USPC .................... 455/449; 455/452.1; 455/452.2; 455/453

(58) Field of Classification Search
None
See application file for complete search history.

(56) References Cited

U.S. PATENT DOCUMENTS

2011/0110251 A1* 5/2011 Krishnamurthy et al. .... 370/252

OTHER PUBLICATIONS

International Search Report issued in PCT/JP2011/064598 mailed Sep. 20, 2011 (1 page).
Written Opinion issued in PCT/JP2011/064598 mailed Sep. 20, 2011 (5 pages).

(Continued)

*Primary Examiner* — Suhail Khan
(74) *Attorney, Agent, or Firm* — Osha Liang LLP

(57) ABSTRACT

A telecommunication control method for a heterogeneous network is provided. Uplink interference created by first user equipment (MUE) connected to a first-type cell (MeNB) is detected at the second-type cell (HeNB). The second-type cell reports the interference pattern of the detected interference to the first-type cell. The first-type cell identifies the interfering first user equipment based upon the interference pattern. The first-type cell notifies the second-type cell of the scheduling information of the interfering first user equipment. The second-type cell determines scheduling for second user equipment (HeUE) connected to the second-type cell based upon the scheduling information of the first user equipment.

9 Claims, 9 Drawing Sheets

(56) References Cited

OTHER PUBLICATIONS

I2R; "eICIC for HeNB UL and MUE DL based on HeNB UL Measurement"; 3GPP TSG RAN WG1 Meeting #61bis, R1-103951; Dresden, Germany; Jun. 28-Jul. 2, 2010 (5 pages).

I2R; "eICIC for HeNB UL and MUE DL based on HeNB UL Measurement"; 3GPP TSG RAN WG1 Meeting #62, R1-104732; Madrid, Spain; Aug. 23-27, 2010 (5 pages).

3GPP TS 36.423 V8.8.0; "3rd Generation Partnership Project; Technical Specification Group Radio Access Network; Evolved Universal Terrestrial Radio Access Network (E-UTRAN); X2 application protocol (X2AP) (Release 8)"; Dec. 2009 (100 pages).

3GPP TS 36.331 V8.8.0; "3rd Generation Partnership Project; Technical Specification Group Radio Access Network; Evolved Universal Terrestrial Radio Access (E-UTRA) Radio Resource Control (RRC); Protocol specification (Release 8)"; Dec. 2009 (211 pages).

* cited by examiner

Case 1: Uplink Interference from MUE to HeNG

Case 2: Downlink Interference from HeNB to MUE

MeNB

HeNB

■ CRS    ▨ PDCCH    ⋅ Data

TELECOMMUNICATION CONTROL METHOD, TELECOMMUNICATION SYSTEM, AND BASE STATION APPARATUS INVOLVING AN INTERCELL INTERFERENCE CONTROL TECHNIQUE

TECHNICAL FIELD

The present invention generally relates to a telecommunication control technique for heterogeneous networks, and more particularly, to an intercell interference control technique for heterogeneous networks.

BACKGROUND ART

For the LTE-Advanced radio technology which is the further advancement of Long Term Evolution, discussions and research are being actively conducted on heterogeneous networks. A heterogeneous network is a network in which mutual connection is established under the circumstances where cells and/or communication devices with different operating systems, protocols, or accessing technologies coexist. For example, mini base stations such as Home eNode Bs (HeNBs), also known as femtocell base stations, are placed and coexist with macro cell base stations (MeNBs) with different transmit power levels or different purposes of operations, and telecommunications are carried out between heterogeneous cells and/or within each of the heterogeneous cells.

A closed subscriber group (CSG) cell is also possible, in the context of heterogeneous networks. A CSG cell provides services only to a limited number of user equipment (UE) terminals that are allowed to access the HeNB.

If a MeNB and HeNBs operate at the same carrier frequency in a MeNB-HeNB coexisting environment, serious issues of mutual interference will arise. There are two possible scenarios of interference.

FIG. 1A illustrates the first scenario, in which a user equipment (MUE) 11 is located in the vicinity of a HeNB 20 and connected to a macro cell (MeNB) 10 on the uplink, creating a large amount of uplink interference in the HeNB 20. To be more precise, if the MUE 11 is accessing the MeNB 10 using the serving link, while the HeNB 20 is receiving signals from a Home eUE (HeUE) 21 which is operating as a CSG member with access to the HeNB in the CSG cell, the radio communication waves transmitted from the MUE 11 become significant interference to the HeNB 20, as indicated by the dashed arrow.

FIG. 1B illustrates the second scenario, in which the HeNB 20 is currently transmitting signals to the HeUE 21 in the vicinity of the MUE 11 and creating a large amount of downlink interference to the MUE 11. To be more precise, if the MUE 11 is receiving signals from the macro cell MeNB 10 during the signal transmission from the HeNB 20 to the HeUE 21, the radio communication waves transmitted from the HeNB 20 to the HeUE 21 become considerable interference to the MUE 11, as indicated by the dashed arrow.

These interference issues are likely to arise not only when the MUE 11 is a non-CSG member of the HeNB 20, but also when the MUE 11 is a CSG member of the HeNB 20, if the MUE 11 is connected to the macro cell MeNB10 in the vicinity of the HeNB 20. A similar problem will occur when the HeNB 20 is located at the edge or the boundary of the macro cell.

Several techniques of intercell interference coordination have been proposed; however, intercell interference cannot be controlled efficiently with these techniques in a heterogeneous network because of their own limits in performing interference coordination. One known technique is to report frequency resources at high interfering levels to neighboring cells by X2 signaling (i.e., notification of overload indicators between macro cells through a wired channel). See, for example, 3GPP TS 36.423. However, this technique can hardly identify which user equipment (MUE) is the interference source in the heterogeneous network because the notification pattern does not have enough granularity in the time domain.

Another known technique is to make use of a measurement report which is adapted to be transmitted from a UE to the macro cell base station when the UE finds a neighboring cell at a high signal level. See, for example, 3GPP TS 36.331. However, transmission of the measurement report is triggered only by a specific event and is not constantly transmitted. Furthermore, additional problems, in that radio resources are occupied by the UE when reporting the measurement result to the macro cell and that the UE bears a great burden, will arise.

DISCLOSURE OF INVENTION

To solve the above-described problems, the invention provides a telecommunication control method, a telecommunication system, and a base station apparatus that can effectively reduce mutual interference between a user equipment (MUE), which is in communication via radio waves with a first-type cell (e.g., a macro cell) in the vicinity of a second-type cell (i.e., a femtocell), and the second-type cell in a heterogeneous network.

To achieve this, an interference pattern is sensed and reported between different types of cells (heterogeneous cells) to identify the interference source, and scheduling is appropriately controlled once the interference source (i.e., the interfering UE) is identified.

In the first aspect of the invention, a telecommunication control method in a heterogeneous network is provided. The method comprises:

at a second-type cell, detecting uplink interference created by first user equipment connected to a first-type cell;

reporting an interference pattern of the detected interference from the second-type cell to the first-type cell;

at the first-type cell, identifying the interfering first user equipment based upon the interference pattern;

at the first-type cell, notifying the second-type cell of scheduling information of the first user equipment; and at the second-type cell, determining scheduling for second user equipment connected to the second-type cell based upon the scheduling information of the first user equipment.

In the second aspect of the invention, a telecommunication control method in a heterogeneous network comprises:

at a second-type cell, detecting uplink interference created by first user equipment connected to a first-type cell;

reporting an interference pattern of the detected interference from the second-type cell to the first-type cell;

at the first-type cell, identifying the interfering first user equipment based upon the interference pattern;

at the first-type cell, determining scheduling for second user equipment connected to the second-type cell based upon scheduling information of the first user equipment;

at the first-type cell, notifying the second-type cell of scheduling information of the second user equipment; and at the second-type cell, carrying out scheduling for the second user equipment based upon the scheduling information of the second user equipment provided from the first-type cell.

In the preferred embodiments, the interference pattern includes interference information in a frequency dimension and a time dimension.

In still another aspect, a base station apparatus used in a heterogeneous network is provided. The base station apparatus comprises:

a radio communication unit configured to communicate with first user equipment located in a cell of the base station;

an interference pattern acquiring unit configured to acquire an uplink interference pattern from a heterogeneous cell, the uplink interference pattern being indicative of interference with the heterogeneous cell due to the first user equipment;

an interfering source identifying unit configured to identify the first user equipment based upon the interference pattern; and a scheduling information notification unit configured to notify the heterogeneous cell of the scheduling information of the identified first user equipment.

With the above-described method and the structure, the interference pattern detected by a certain-type cell is reported to another type cell and the interference source can be efficiently identified in a heterogeneous network. Thus, mutual interference between different types of cells (e.g., between a macro cell and a femtocell) can be reduced.

DETAILED DESCRIPTION OF THE EMBODIMENTS

Figure 1A:
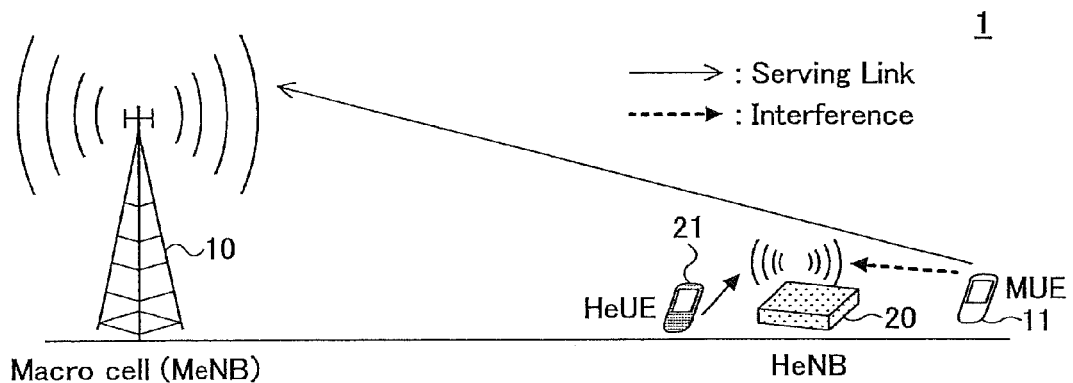
FIG. 1A is a schematic diagram illustrating uplink interference to a HeNB created by a MUE which is in communication with a macro cell.
Figure 1B:
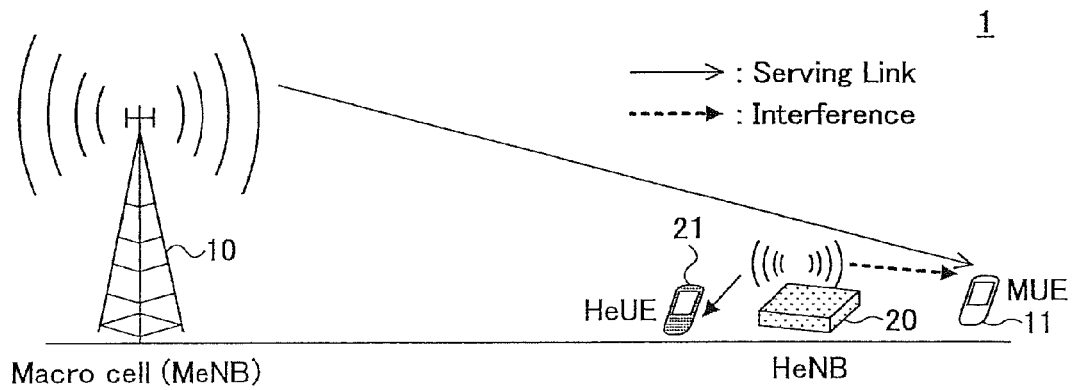
FIG. 1B is a schematic diagram illustrating downlink interference to the MUE connected to the macro cell, created by the HeNB on downlink.

The preferred embodiments of the present invention will now be described below in conjunction with the attached drawings. The communication control method and system of the embodiments are applied to a heterogeneous network 1, as illustrated in FIG. 1A and FIG. 1B, in which different types of cells or base stations with different transmit power levels or different purposes of operations coexist. In the examples of FIG. 1A and FIG. 1B, a first-type cell (e.g., a macro cell MeNB) 10 and a second-type cell (e.g., a femtocell HeNB) 20 coexist in the same network. A MUE 11 is adapted to communicate with the MeNB 10 on the serving link provided by the macro cell. A HeUE 21 is adapted to communicate with the HeNB 20 on the serving link provided by the femtocell. The first-type cell MeNB 10 and the second-type cell HeNB 20 are capable of mutually exchanging information by means of an arbitrary interface (such as an X2 interface).

With this network architecture, mutual interference becomes conspicuous when the MUE 11 is located in the vicinity of the HeNB 20 or the HeNB 20 is located at the edge of the macro cell. In the case of FIG. 1A, the uplink radio communication waves transmitted from the MUE 11 becomes interference in the uplink transmission conducted in the femtocell HeNB 20. In the case of FIG. 1B, the downlink radio communication from the HeNB 20 to the HeUE 21 becomes interference in the downlink transmission from the macro cell (MeNB) 10 to the MUE 11. Some efficient techniques to avoid such interference issues will be proposed below.

[First Embodiment]

In the embodiments, the MeNB 10 identifies the interfering MUE 11 that is currently causing interference in the HeNB 20 based upon the interference pattern reported from the HeNB 20. Then, scheduling for the HeUE 21 is carried out at the HeNB 20 so as to avoid interference with the MUE 11 based upon the scheduling information about the identified MUE 11. These arrangements are common in the embodiments.

In the first embodiment, the HeNB 20 determines scheduling for the HeUE 21 based upon the scheduling information of the MUE 11 transmitted from the MeNB 10. In other words, the Macro cell MeNB 10 determines and carries out scheduling for the MUE 11, while the HeNB 20 determines and carries out scheduling for the HeUE 21 based upon the MUE scheduling information supplied from the MeNB 10.

Figure 2:
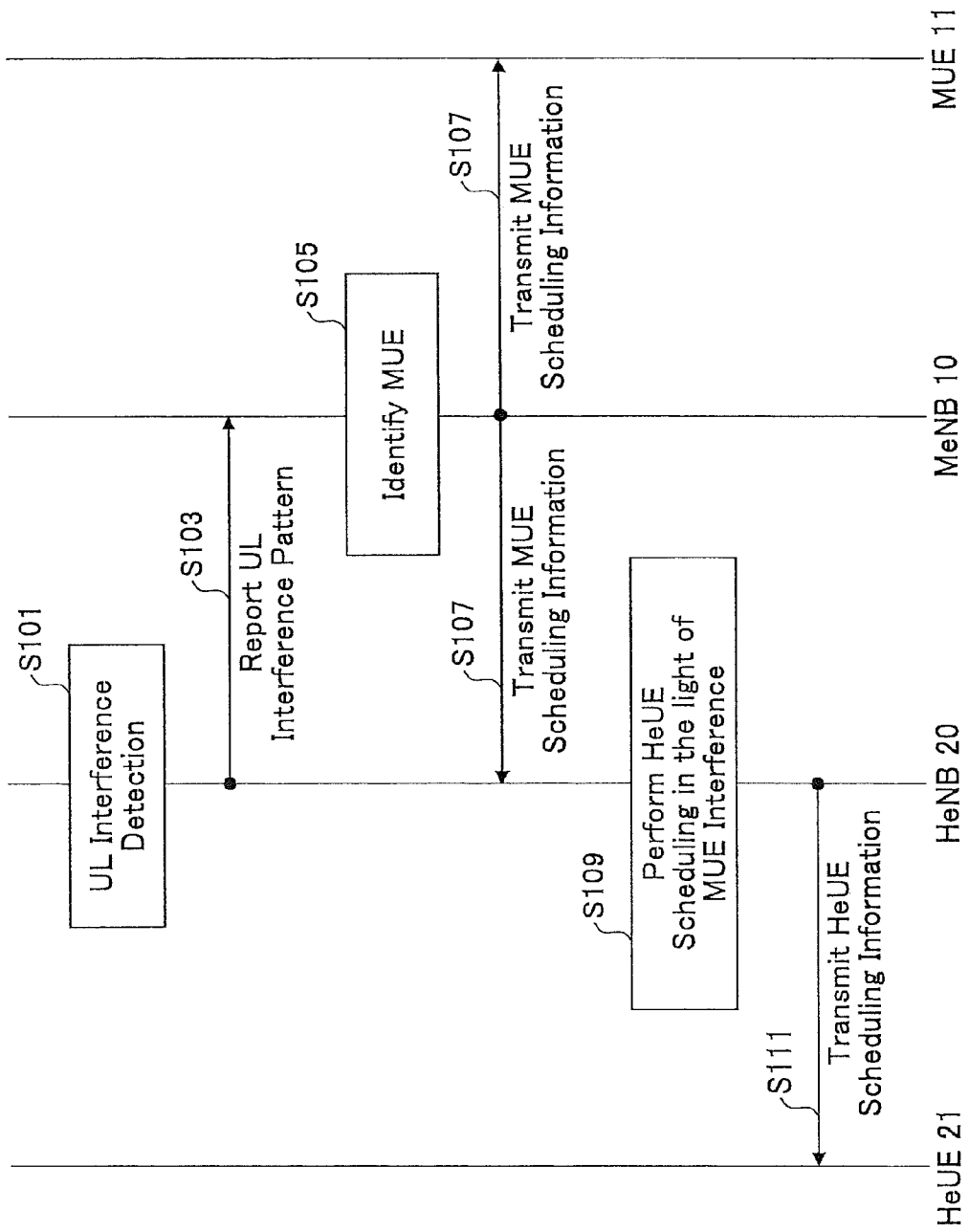
FIG. 2 is a sequence diagram illustrating telecommunication control carried out in the heterogeneous network according to the first embodiment of the invention.
Figure 3:
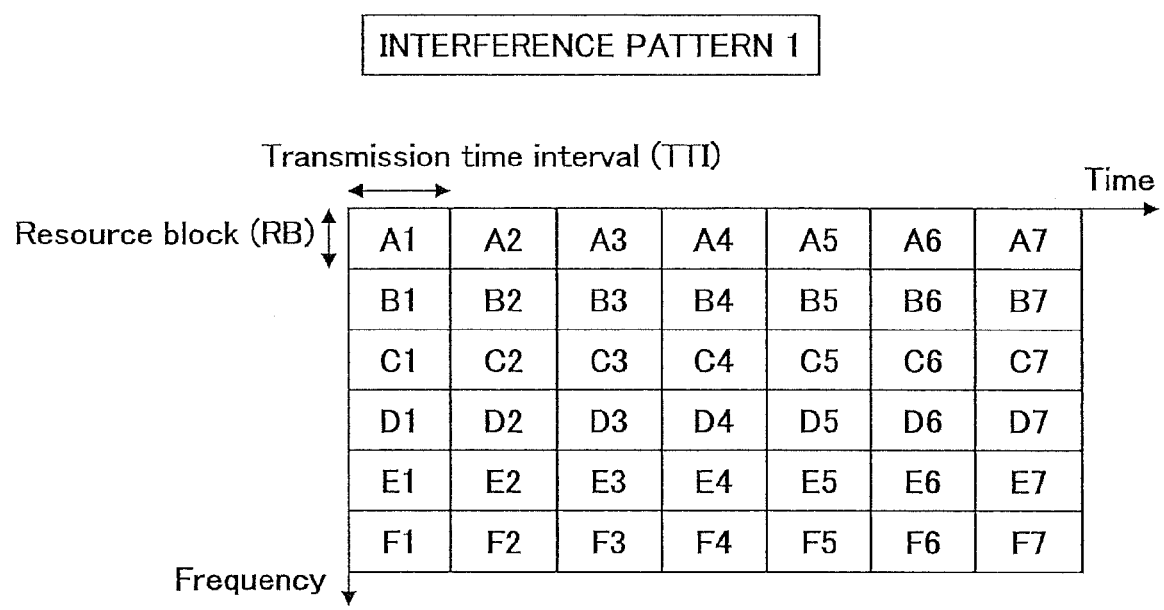
FIG. 3 illustrates an example of the interference pattern reported to the MeNB according to the first embodiment of the invention.

FIG. 2 is a sequence diagram illustrating a specific example of the communication control technique according to the first embodiment. First, in S101, the HeNB 20 detects uplink interference and generates an interference pattern. The interference may be sensed in both the time and the frequency directions to create a two-dimensional interference pattern. FIG. 3 illustrates one example of the interference pattern created in the first embodiment. In this example, the interference level is measured throughout the assigned frequency resource blocks (RBs) over a prescribed time period. Interference is sensed, for example, over time blocks 1-7 for the entirety of the frequency blocks A-F. The interference pattern is created for the unit time period of TTI×7, for example, with respect to the transmission time interval (TTI). However, the invention is not limited to this example and a desired unit time period may be selected to create an interference pattern. The transmission time interval (TTI) is, for example, 1 ms in an LTE system.

Next, in S103, the HeNB 20 reports the sensed interference pattern to the MeNB 10. In reporting the interference pattern, the HeNB 20 may transmit the interference levels (as numerical values) of all the resource blocks A1 through F7 to the MeNB 10 for example by X2 signaling through wire.

Next, in S105, the MeNB 10 identifies the interfering MUE 11 currently causing interference in the HeNB 20, based upon the received interference pattern. To identify the interfering MUE 11, the MeNB 10 compares the received interference pattern with the past scheduling information (e.g., UL grant allocation information) held in the MeNB 10 to select a UE that is conducting uplink transmission that has a high correlation with the resource allocation pattern. Because the UL interference pattern reported from the HeNB 20 contains interference information in the time domain, the MeNB 10 can identify the interfering MUE with high precision.

Next, in S107, the MeNB 10 transmits scheduling information (such as UL resource allocation information) to the MUE 11. The MeNB 10 also transmits the scheduling information of the MUE 11 to the HeNB 20. Transmission of the scheduling information to the MUE 11 and the HeNB 20 may be carried out by either method described below.

The first method is to inform the MUE 11 of the uplink resource allocation over a UL wireless channel grant, while informing the HeNB 20 of the MUE scheduling information over the X2 wired signaling channel. With this method, delay in the wire part is significant (for example, about 10 ms delay may be generated), and accordingly, long-period allocation for several tens of milliseconds is premised.

Figure 4:
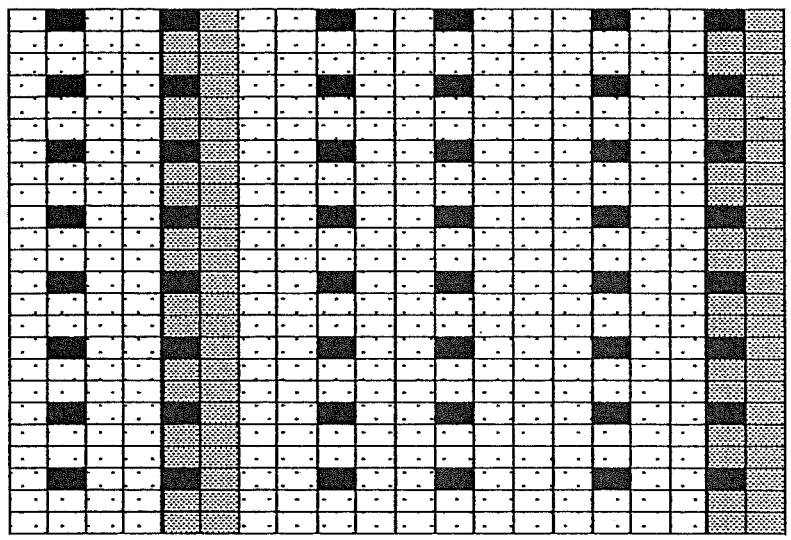
FIG. 4 illustrates transmission timing of the MUE scheduling information transmitted by the MeNB, which timing is offset from that of the femtocell to coordinate intercell interference.
Figure 4:
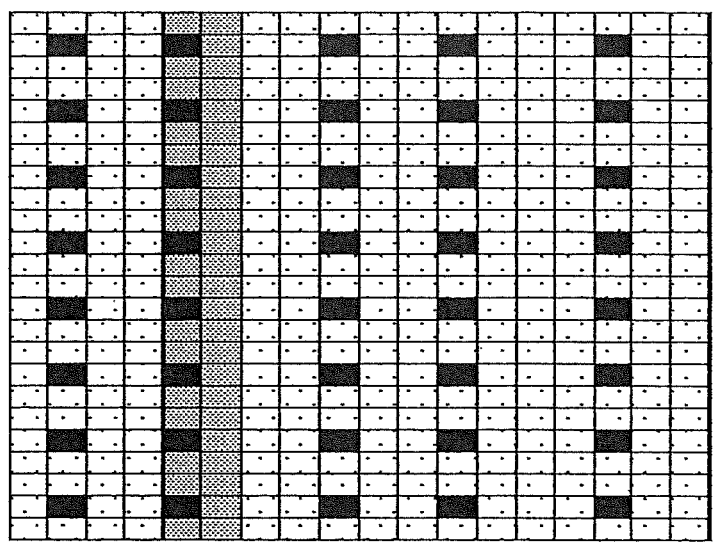

The second method is to inform the MUE 11 and the HeNB 20 of the uplink resource allocation using UL/DL grants. This method is based on the premise that the HeNB 20 is furnished with a function of receiving a downlink channel from the macro cell. In this case, the HeNB 20 performs PDCCH blind decoding, and accordingly, the HeNB 20 has to know the UE-ID information of the MUE 11 in advance. In addition, interference with other downlink control signals has to be avoided when transmitting the MUE scheduling information to the HeNB 20 on a wireless channel. In this regard, it is desired to conduct intercell interference coordination to provide an offset to the PDCCH transmission timing between the MeNB 10 and the HeNB 20, as illustrated in FIG. 4. In this figure, the PDCCH transmission timing of the HeNB is offset from that of the MeNB. The transmission timing offset is advantageous for avoiding interference with other downlink control signals. It is also advantageous from the viewpoint that some processing time is required for the HeNB 20 to determine scheduling for the femtocell based upon the decoded MUE scheduling information.

Returning to FIG. 2, in S109, the HeNB 20 determines scheduling for the HeUE 21 (by, for example, allocating UL resources) so as not to conflict with the resource allocated to the MUE 11, based upon the MUE scheduling information provided from the macro cell. Then, in S111, the HeNB 20 transmits the scheduling information to the HeUE 21. The HeUE 21 conducts telecommunication with HeNB 20 using the allocated resources that do not interfere with the uplink transmission from the MUE 11. In this manner, uplink interference from the MUE 11 (in the HeNB 20) shown in FIG. 1A can be avoided.

The above-described technique is also effective to control the downlink interference illustrated in FIG. 1B. The fact that the interfering level due to the MUE 11 and measured at the HeNB 20 is high means that the MUE 11 is currently located in the vicinity of the HeNB 20. In this situation, the downlink transmission from the HeNB 20 to the HeUE 21 causes significant interference in the MUE 11 which is receiving signals from the MeNB 10 in the vicinity.

To overcome this problem, upon identifying the interfering MUE 11 currently affecting the HeNB 20 from the uplink interference pattern, the downlink scheduling information (DL grant) for the MUE 11 is reported to the HeNB 20 in step S107. Then, in S109, the HeNB 20 determines downlink scheduling for the HeUE 21 so as not to conflict with the downlink resource allocated to the MUE 11, and transmits the scheduling information (DL grant) to the HeUE 21 on the PDCCH in S111. In this manner, the downlink interference (from the HeNB 20 to MUE 11) illustrated in FIG. 1B can be avoided.

Figure 5:
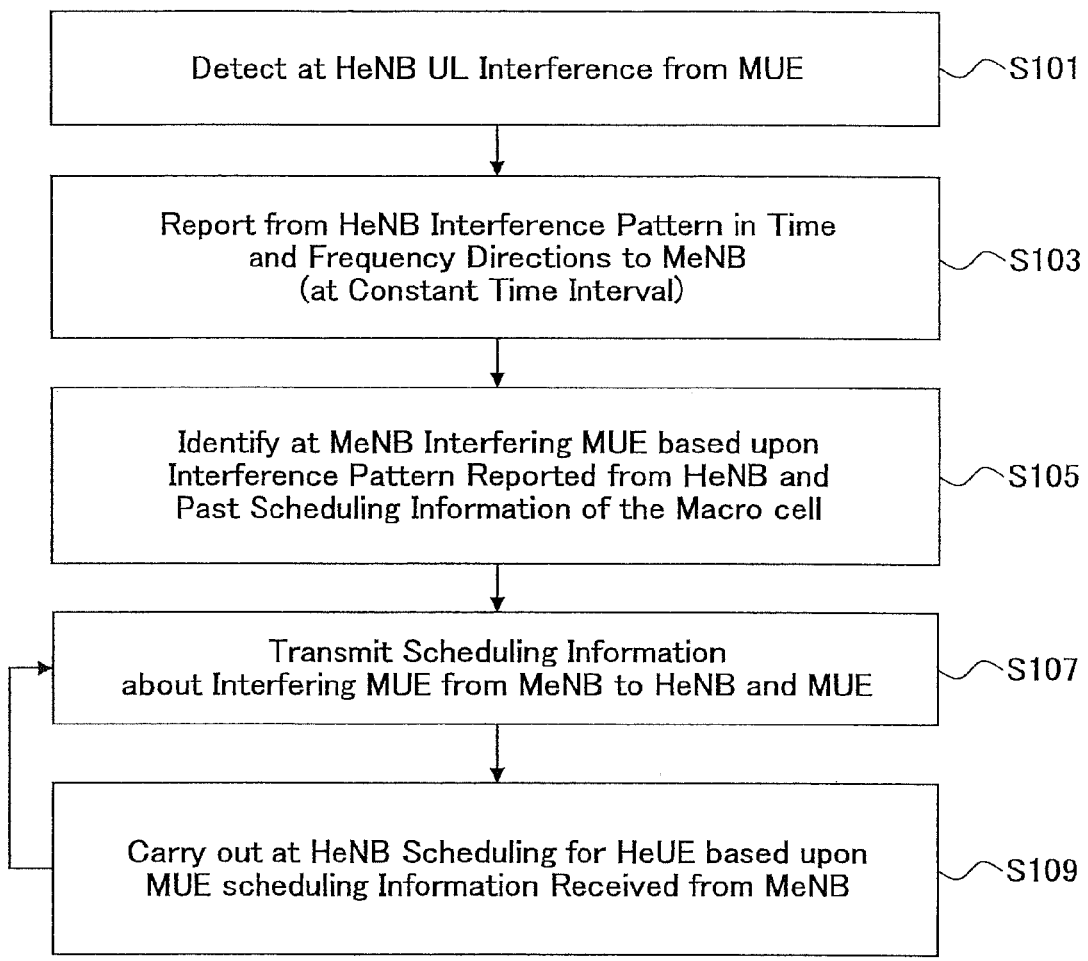
FIG. 5 is a flowchart of the communication control method corresponding to the sequence diagram of FIG. 2.

FIG. 5 is a flowchart of the telecommunication control method corresponding to the sequence diagram of FIG. 2. Since many parts overlap the sequences of FIG. 2, the process flow is briefly explained. The same steps as those in FIG. 2 are denoted by the same symbols.

In S101, the HeNB 20 detects uplink interference signals from MUE 11. In S103, the HeNB 20 reports the interference pattern of the received signal, which pattern is expressed in both the time and frequency domains, to the MeNB 10. The interference pattern may be reported at constant intervals. Then, in S105, MeNB 10 identifies the interfering MUE 11 based upon the interference pattern sensed by the HeNB 20 and the past scheduling information held in the MeNB 10. In S107, MeNB 10 transmits the scheduling information of the interfering MUE 11 to both the MUE 11 and the HeNB 20. The HeNB 20 carries out scheduling for the HeUE 21 based on the scheduling information of the MUE 11 received from the MeNB 10.

If the MUE 11 is a non-CSG member of the HeNB 20, the HeNB 20 cannot recognize which MUE is currently interfering with the femtocell. However, by feeding the measured interference pattern back to the MeNB 10 (S103), the HeNB 20 can appropriately allocate UL and DL resources to the HeUE 21 in the femtocell so as to avoid mutual interference with the MUE 11 (S109).

The same applies if the MUE 11 is a CSG member of the HeNB 20. When the MUE 11 is conducting wireless communication with the macro cell MeNB 10 in the vicinity of the HeNB 20, mutual interference will be a problem to both the MUE 11 and the HeNB 20. Accordingly, the telecommunication control method shown in FIG. 5 can be effectively used regardless of whether the MUE 11 belongs to the CSG of the HeNB 20.

[Second Embodiment]

Figure 6:
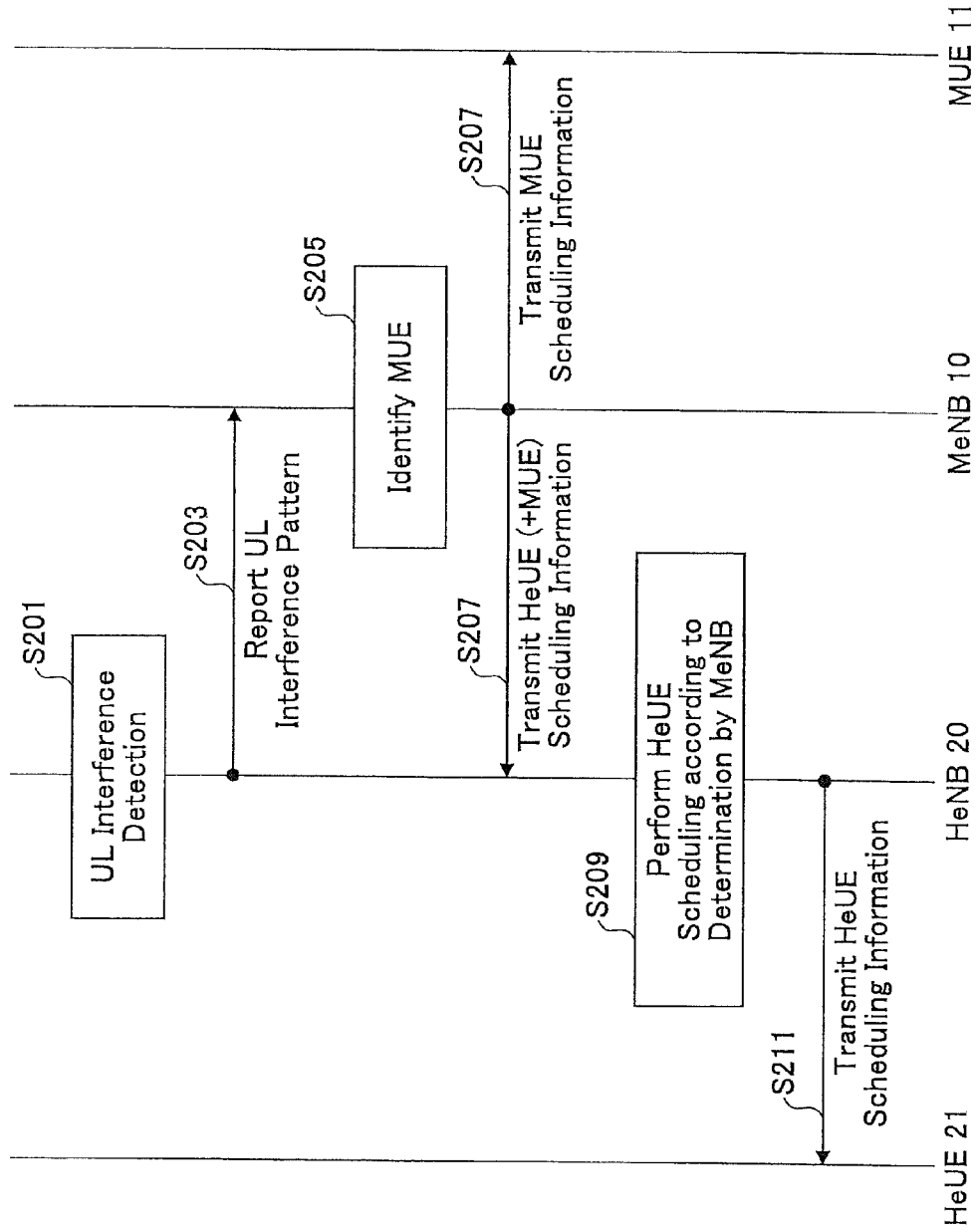
FIG. 6 is a sequence diagram illustrating telecommunication control carried out in the heterogeneous network according to the second embodiment of the invention.

FIG. 6 is a sequence diagram illustrating an example of telecommunication control according to the second embodiment of the invention. In the second embodiment, the macro cell MeNB 10 carries out scheduling not only for the MUE 11, but also for the HeUE 21, and notifies the femtocell HeNB 20 of the scheduling information of the HeUE 21.

In S201, the HeNB 20 detects uplink interference and generates an interference pattern. In S203, the HeNB 20 reports the interference pattern to the MeNB 10. The sensing of the uplink interference in S201 is conducted in both the time and the frequency domains as in the first embodiment. However, the interference pattern reported in 5203 is with a reduced signaling traffic volume, which is different from the first embodiment.

Figure 7:
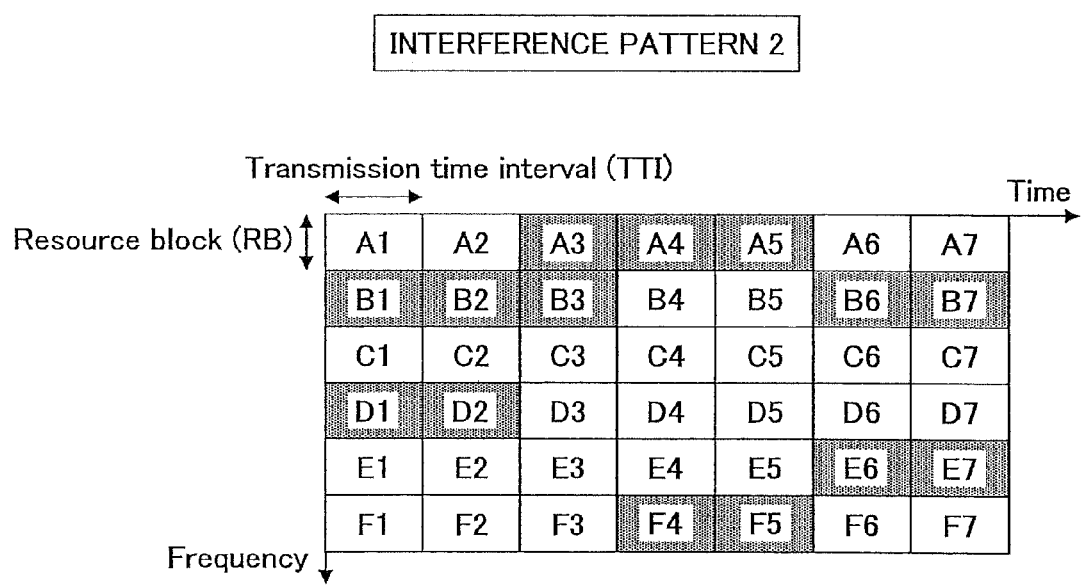
FIG. 7 illustrates an example of the interference pattern reported to the MeNB according to the second embodiment of the invention.

FIG. 7 illustrates an example of the interference pattern used in the second embodiment. In the first embodiment, the entire information of blocks A1 through F7 are reported constantly to the MeNB 10 without setting limitations on the interference levels or the resource locations, and the increase in the signaling traffic between the HeNB 20 and the MeNB 10 may be of concern. Since in the second embodiment additional scheduling information of the HeUE 21 is transmitted from the MeNB 10 to the HeNB 20, it is preferred to reduce the signaling traffic volume of the interference pattern.

In this regard, only the location information about the resource blocks with the interference levels exceeding a prescribed threshold level is transmitted to the MeNB 10, as illustrated in FIG. 7. In FIG. 7, the location information of the dark blocks is transmitted. Because a time-domain interference factor is added to the over-threshold frequency resource information, a two-dimensional interference pattern can be reported under reduced volume of signaling traffic. Although the transmit time interval (TTI) is used as the time-axis scale and seven TTIs are set as a unit time as in the first embodiment, the invention is not limited to this example and any appropriate unit time may be selected.

Next, in S205, the MeNB 10 identifies the interfering MUE 11 that is currently affecting the HeNB 20, based upon the received interference pattern. The interfering MUE 11 can be identified by comparing the received interference pattern with the past scheduling information (e.g., UL grant allocation information) held by the MeNB 10 to select a UE conducting uplink transmission with a similar resource-allocation pattern. Because the interference pattern representing the resource blocks with over-threshold interference levels contains the time-domain interference information, the MeNB 10 can identify the interfering MUE 11 with high precision.

Next, in S207, the MeNB 10 carries out scheduling for the MUE 11, and it also determines scheduling for the HeUE 21 located in the femtocell HeNB 20 based upon the resource allocation to the MUE 11. The MeNB 10 transmits the MUE scheduling information to the MUE 11, while transmitting the scheduling information of the HeUE 21 to the HeNB 20. In addition to the HeUE scheduling information, the MUE scheduling information may be transmitted optionally to the HeNB 20.

Then, in S209, the HeNB 20 carries out scheduling for the HeUE 21 in the femtocell according to the scheduling information determined by the macro cell MeNB 10. In S211, the HeNB 20 transmits the HeUE scheduling information on the PDCCH to the HeUE 21.

As in the first embodiment, both uplink resource allocation (UL grant) and downlink resource allocation (DL grant) can be included in each of the MUE scheduling information and the HeUE scheduling information. With this arrangement, both Case 1 interference (i.e., uplink interference from neighboring MUE to HeNB) shown in FIG. 1A and Case 2 interference (i.e., downlink interference from HeNB to neighboring MUE) shown in FIG. 1B can be reduced.

Figure 8:
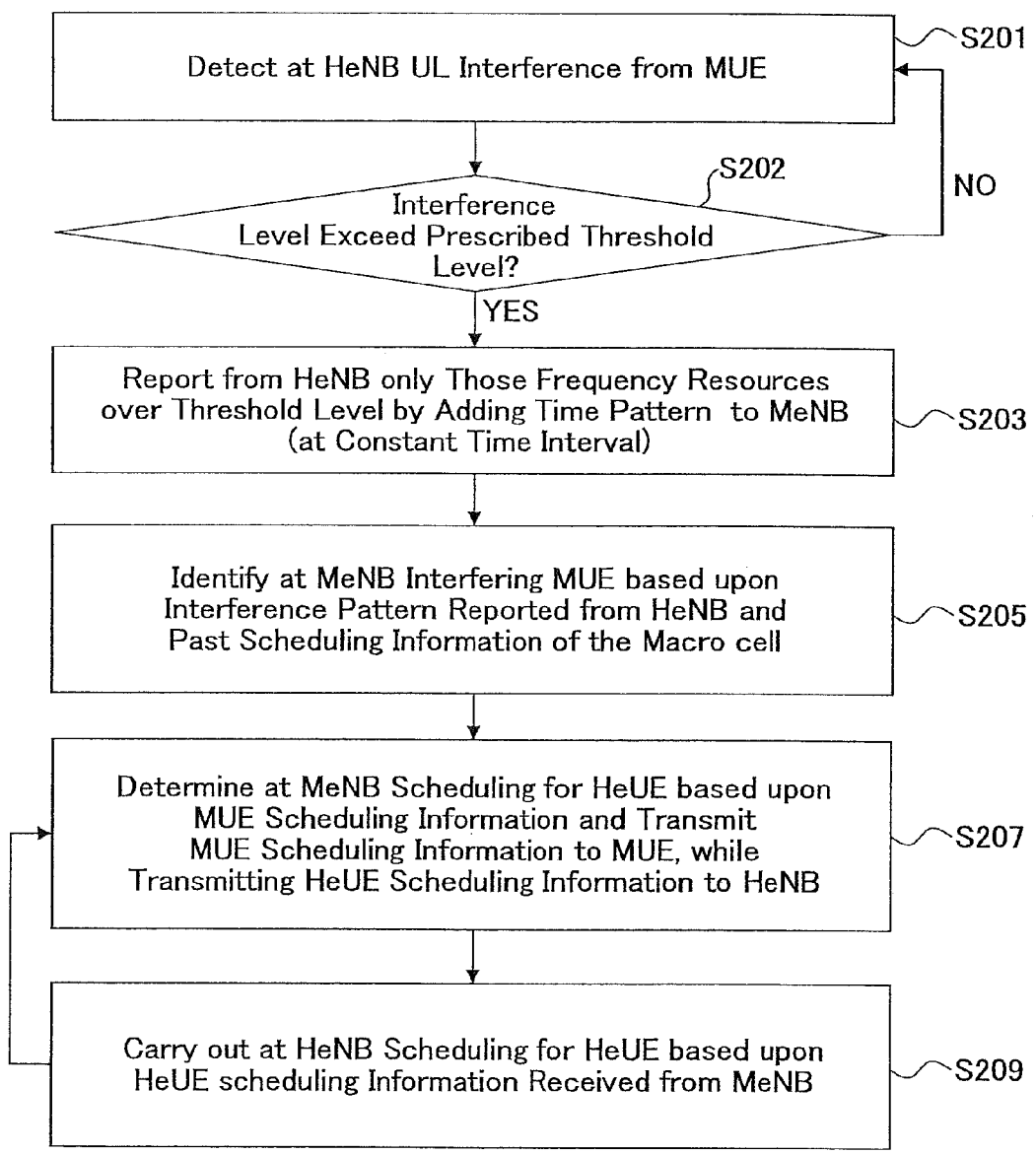
FIG. 8 is a flowchart of the communication control method corresponding to the sequence diagram of FIG. 6.

FIG. 8 is a flowchart of the telecommunication control method according to the second embodiment. Since many parts overlap the sequences of FIG. 6, the process flow is briefly explained. The same steps as those in FIG. 2 are denoted by the same symbols.

In S201, the HeNB 20 detects uplink interference signals from the MUE 11. In S202, the HeNB 20 determines the interference level. If the interference level is at or below the threshold level (NO in S202), the process returns to S201 to continue the detection of interference signals. If the sensed interference level exceeds the threshold level (YES in S202), the process proceeds to S203, in which the HeNB 20 adds the time-domain interference information for the over-threshold resource blocks and reports the interference pattern to the MeNB 10 at constant intervals, for example.

Then, in S205, the MeNB 10 identifies the interfering MUE 11 based upon the interference pattern received from the HeNB 20 and the past scheduling information held in the macro cell. Upon identification of the interfering MUE 11, the process proceeds to S207, in which the MeNB 10 determines scheduling for the MUE 11 and then further determines scheduling for the HeUE 21 based on the MUE scheduling information. The MeNB 10 then transmits the MUE scheduling information to the MUE 11, while transmitting the HeUE scheduling information to the HeNB 20. In S209, the HeNB 20 carries out scheduling for the HeUE 21 according to the received HeUE scheduling information.

Figure 9:
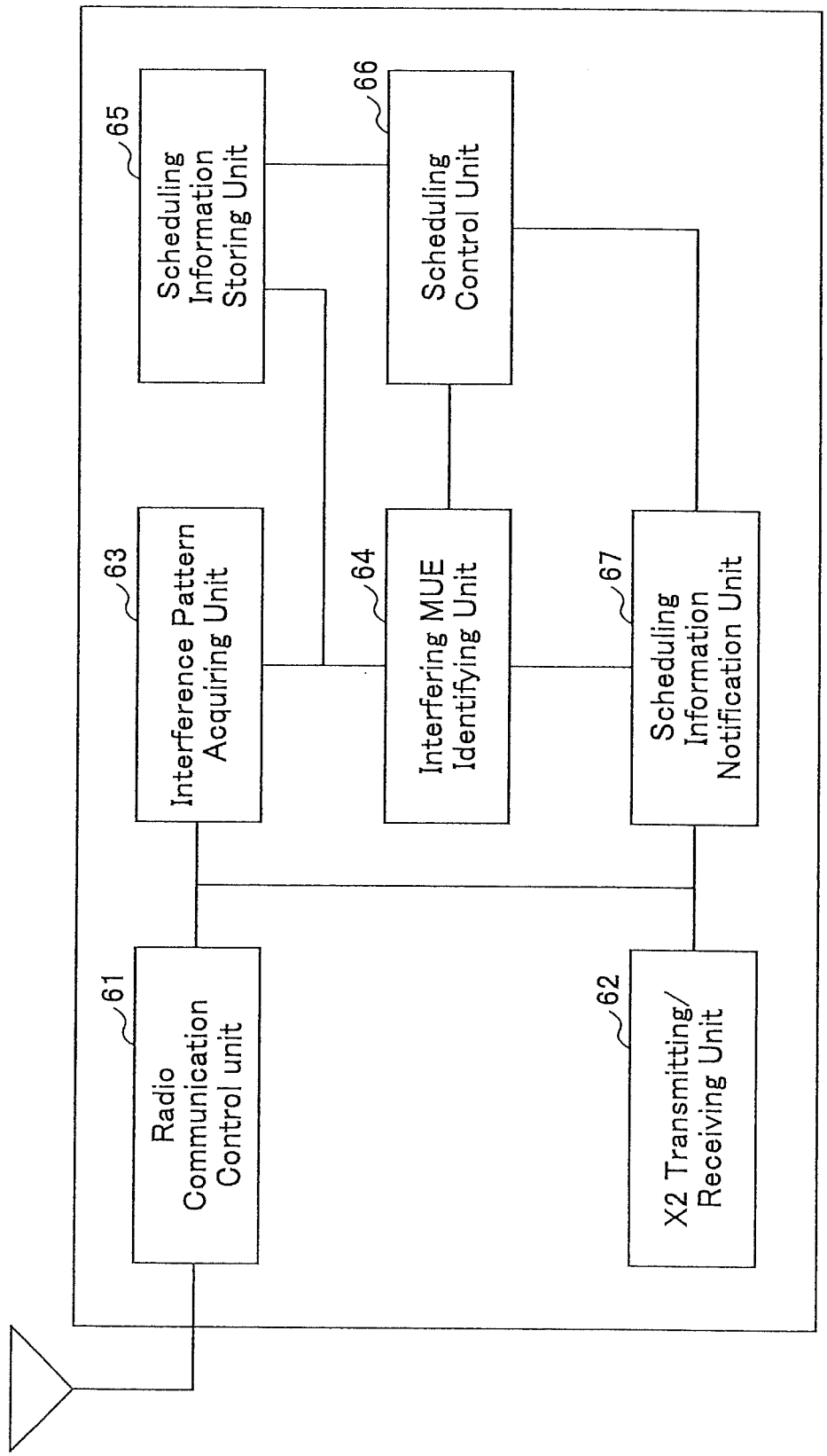
FIG. 9 is a schematic block diagram illustrating the structure of the macro cell base station (MeNB) used in the embodiments of the invention.

FIG. 9 is a schematic block diagram of the MeNB 10 used in the above-described embodiments. The MeNB 10 has a radio communication control unit 61, an X2 transmitting/receiving unit 62, an interference pattern acquiring unit 63, an interfering MUE identifying unit 64, a scheduling information storing unit 65, a scheduling control unit 66, and a scheduling information notification unit 67. The MeNB 10 receives the interference pattern from the HeNB 20. The interference acquiring unit 63 acquires the interference pattern via the radio communication control unit 61 or the X2 transmitting/receiving unit 62. The interfering MUE identifying unit 64 compares the acquired interference pattern with the past scheduling information stored in the scheduling information storing unit 65 to identify the MUE to which uplink resources are allocated in a pattern that has high correlation with the received interference pattern. The scheduling control unit 66 determines resource allocation to the MUE 11. If the MeNB 10 is adapted to determine scheduling for the HeUE 21 as in the second embodiment, then the scheduling control unit 66 determines uplink/downlink resource allocation to the HeUE 21 so as not to interfere with the resources allocated to the MUE 11 based upon the MUE scheduling information.

The scheduling information notification unit 67 generates a PDCCH for transmitting the scheduling information (e.g., UL grant and/or DL grant) of the MUE 11 and supplies the generated channel to the radio communication control unit 61. If the MUE scheduling information and/or the HeUE scheduling information (the second embodiment) is/are to be transmitted to the HeNB 20 on a wireless channel, the UE-ID information of the MUE 11 is reported in advance to the HeNB 20 via, for example, the X2 interface. The radio communication control unit 61 transmits the MUE scheduling information to both the MUE 11 and the HeNB 20. Alternatively, the radio communication control unit 61 transmits the MUE scheduling information to the MUE 11, while transmitting the HeUE scheduling information to the HeNB 20.

If the scheduling information is transmitted by X2 signaling to the HeNB 20, the scheduling information notification unit 67 generates long-period allocation information and supplies the generated information to the X2 transmitting/receiving unit 62. The X2 transmitting/receiving unit 62 transmits the scheduling information to the HeNB 20.

As has been described above, the telecommunication control techniques of the first and second embodiments can efficiently achieve interference control (including intercell interference coordination) in a heterogeneous network by means of the signaling between the femtocell HeNB 20 and the macro cell MeNB 10. These techniques do not require excessive signaling (including feedback signals) from UEs, and occupation of radio resources can be reduced, while preventing overload on the UEs.

Although the invention has been described in conjunction with specific embodiments, the present invention is not limited to these examples and many substitutions, modifications and alterations are possible within the scope of the invention. For example, although in the first embodiment the entirety of the interference levels is reported from the femtocell to the macro cell as shown in FIG. 3, the interference pattern reporting method of the second embodiment may be employed in the first embodiment such that only the resource locations of resource blocks with over-threshold interference levels are reported to the macro cell as shown in FIG. 7, in order to reduce the signaling traffic volume. Similarly, the interference pattern reporting method of the first embodiment may be employed in the second embodiment to improve the accuracy of identification of interfering UEs by transmitting all the interference levels to the macro cell as shown in FIG. 3. Another example, although in the embodiments only one MUE is described and identified at MeNB, it is easy to adapt to the cases that there are two or more MUEs in the vicinity of the HeNB. After receiving the aggregated interference pattern due to two or more MUEs, the MeNB may also compare a combination of past scheduling patterns for two or more MUEs in order to identify more than one MUE.

This international patent application claims the benefit of the earlier filing date of Japanese Priority Application No. 2010-141083 filed on Jun. 21, 2010, the entire contents of which are incorporated herein by reference.

The invention claimed is:

1. A telecommunication control method in a heterogeneous network, comprising:
    at a second-type cell, detecting uplink interference created by first or first set of user equipments connected to a first-type cell;
    reporting an interference pattern of the detected interference from the second-type cell to the first-type cell;
    at the first-type cell, identifying the interfering first or first set of user equipments based upon the interference pattern;
    at the first-type cell, notifying the second-type cell of scheduling information of the first or first set of user equipments; and
    at the second-type cell, determining scheduling for second or second set of user equipments connected to the second-type cell based upon the scheduling information of the first or first set of user equipments.

2. The telecommunication control method of claim 1, wherein the interference pattern includes interference information in a frequency dimension and a time dimension.

3. The telecommunication control method of claim 1, wherein the reporting of the interference pattern includes:
    detecting interference levels of all frequency resource blocks at each of time blocks over a prescribed unit time; and
    transmitting all the detected interference levels to the first-type cell.

4. The telecommunication control method of claim 1, wherein the reporting of the interference pattern includes:
    detecting interference levels of all frequency resource blocks at each of time blocks over a prescribed unit time; and
    transmitting location information of resource blocks with the interference levels exceeding a prescribed threshold level.

5. The telecommunication control method of claim 1, wherein the first-type cell notifying the second-type cell of the scheduling information is conducted by means of X2 signaling.

6. The telecommunication control method of claim 1, wherein the first-type cell notifying the second-type cell of the scheduling information is conducted by wireless communication.

7. The telecommunication control method of claim 6, wherein the first-type cell notifying the second-type cell of the scheduling information is conducted on a downlink physical control channel, and timing of the scheduling of the user equipments carried out at the second-type cell is offset from transmission timing of the downlink physical control channel at the first-type cell.

8. The telecommunication control method of claim 1, wherein the scheduling information sent from the first-type cell to the second-type cell includes at least one of a UL grant and a DL grant.

9. A telecommunication system comprising:
    a first-type cell in a heterogeneous network;
    first or first set of user equipments connected to the first-type cell;
    a second-type cell in the heterogeneous network; and
    second or first set of user equipments connected to the second-type cell,
    wherein the second-type cell has means for detecting uplink interference from the first or first set of user equipments and reporting an interference pattern of the detected interference to the first-type cell, and the first-type cell has means for acquiring the interference pattern, means for identifying the first or first set of user equipments based upon the acquired interference pattern, and means for notifying the second-type cell of scheduling information of the first or first set of user equipments, and
    wherein the second-type cell carries out scheduling for the second or second set of user equipments based upon the scheduling information of the first or first set of user equipments.

* * * * *